March 26, 1968 A. FRANCK 3,375,358
BINARY ARITHMETRIC NETWORK
Filed Aug. 30, 1965
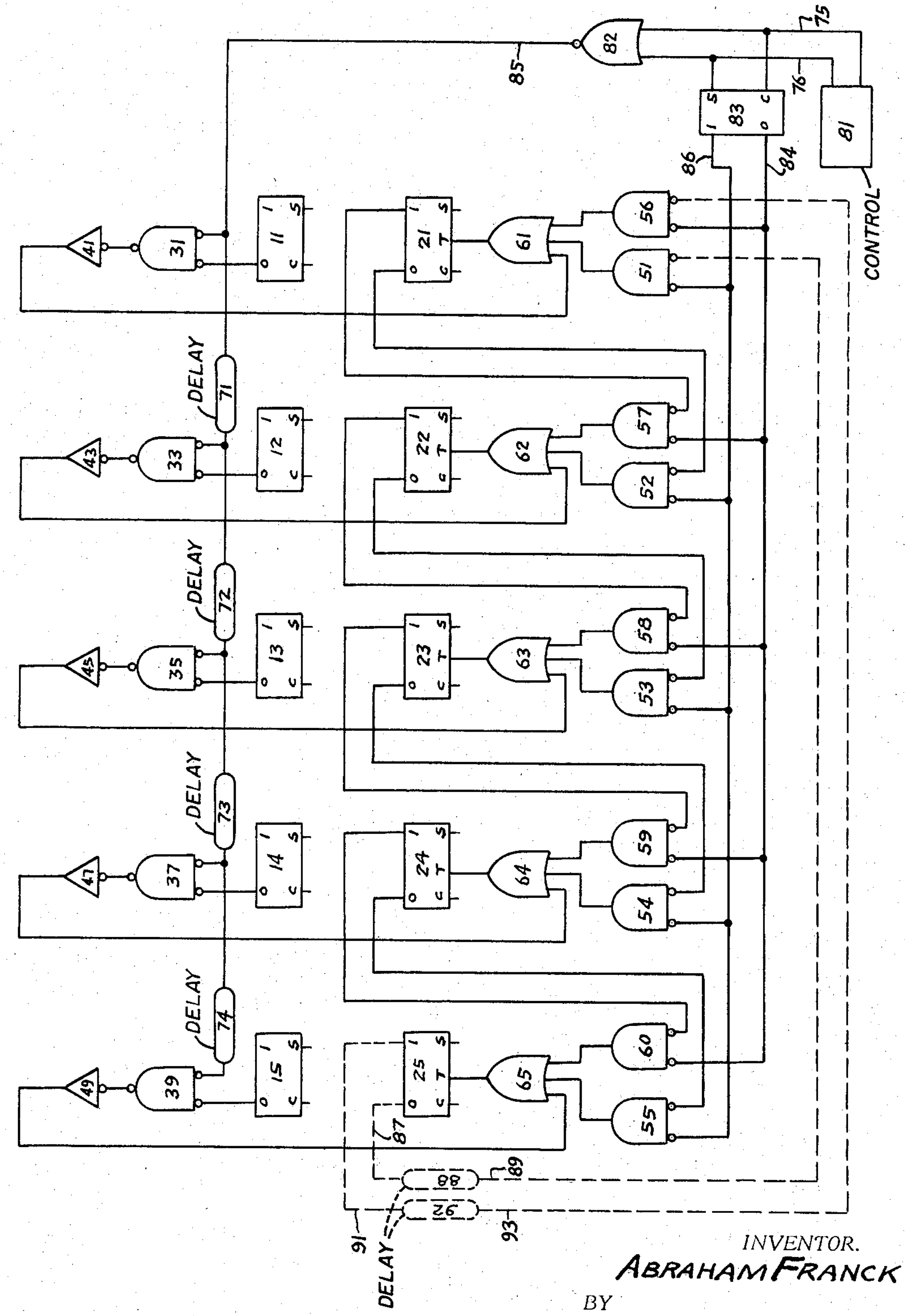
INVENTOR.
ABRAHAM FRANCK
BY
Braddock & Burd
ATTORNEYS

United States Patent Office 3,375,358

Patented Mar. 26, 1968

3,375,358

BINARY ARITHMETIC NETWORK

Abraham Franck, Minneapolis, Minn., assignor to Fabri-Tek Incorporated, Minneapolis, Minn., a corporation of Wisconsin Filed Aug. 30, 1965, Ser. No. 483,765

7 Claims. (Cl. 235—175)

ABSTRACT OF THE DISCLOSURE

A binary adder-subtractor network having a first register comprising a plurality of bistable storage elements and adapted to hold the addend-subtrahend, and a second register also comprising a plurality of bistable elements and adapted to hold the augend-minuend. The bistable elements of the second register are logically connected to form an up-down counter, the direction of count being selective dependent upon whether addition or subtraction is desired. The second register also acts as the accumulator, thus holding the final results. Accumulation is achieved by adding or subtracting the appropriate addend or subtrahend bit at the corresponding bit significance of the accumulator-counter. Because of the counting action of the accumulator, the sum or difference is formed.

This invention is concerned with computing methods and apparatus, and more particularly with a network and method for performing binary arithmetic.

There are numerous forms of adder-subtractor networks presently known in the art. In general, whether they be serial or parallel networks, these prior art networks include a register for storing the addend-subtrahend, a register for storing the augend-minuend, addition-subtraction logic which receives data from each of the two registers, a third register which acts as an accumulator for storing the total, and additional storage or logic networks for providing for carries or borrows from the bits last added-subtracted to the bits to be next added-subtracted. These prior art networks necessarily require a significant amount of hardware. The apparatus of this invention provides a completely operative adder-subtractor network, yet significantly minimizes the necessary electronic hardware. Briefly, this significant reduction in hardware is achieved by using only two storage registers, the augend-minuend register being connected as a counter and acting as the accumulator, with successive bits of the number in the addend-subtrahend register being gated individually into the accumulator register in proper timing sequence starting from the least significant bit and proceeding toward the most significant bit. Ripple-through logic is used in performing the counting process, and proper delay between bit transfers is provided to allow for the counting process in the accumulator register.

Briefly described, this invention concerns the addition and subtraction of binary numbers stored in a pair of binary storage registers. The registers comprise an equal number of bistable elements capable of assuming a true or false stable state to represent a binary digit, hereinafter called a bit. A first of the two storage registers contains the addend, or the subtrahend, while a second of the two registers contains the augened, or the minuend. Any number of various external means can be used to place the desired numbers into the first and second registers.

The bistable elements of the second register are interconnected by logic gates which can be enabled to form the bistable elements into an up-down counter. Further logic gates connect each bistable element of the first register to a corresponding bistable element of the same bit significance in the second register. Control apparatus is also present to provide control signals for initiating the addition and subtraction sequences.

In the presence of a control signal from the control apparatus, the up-down counter logic will be enabled. Also, the control signal will serve to sequentially transfer information from the bistable elements in the first register to the bistable elements in the second register, the sequence being from the least significant bit to the most significant bit of the binary numbers stored in the first register. The sequence timing is controlled by delay means serially connected between the source of control signal and the logic gates which must be enabled to transfer information from the first to the second register.

When a transfer of information from a bistable element in the first register to a corresponding bistable element in the second register causes the corresponding bistable element to change from a predetermined stable state to another stable state, the up-down counter will be actuated, and will count down or up from the bistable element which has changed state to the most significant bistable element.

For the performance of 1's-complement arithmetic, and end-around carry or borrow can be provided by connecting the bistable element representing the most significant bit in the binary number stored in the second register to the bistable element representing the least significant bit, to initiate a count down or up sequence when an end-around carry or borrow is present.

In the drawings:

The single figure of the drawings is a logical schematic representing a preferred embodiment of the arithmetic network of this invention.

The logic symbols used in the single figure of the drawing are in accordance with standard MIL Specifications; reference being made particularly to MIL Specification 806B.

Referring to the single figure of the drawings, there is shown a first storage register comprising a first plurality of bistable elements 11, 12, 13, 14 and 15. There is also shown a second binary storage register comprising a second plurality of bistable elements 21, 22, 23, 24 and 25. Bistable elements 11–15 and 21–25 are here shown as flip-flops, though it will be apparent that various bistable storage elements may be used without departing from the spirit of this invention.

Each of flip-flops 11–15 and 21–25 has a "0" or false output terminal, and a "1" or true output terminal, representing the two stable states of the bistable elements. Each of the flip-flops also has a "C" input terminal, and an "S" input terminal. The "C" input terminal is for clearing the bistable element. The 'S" input terminal is for setting the bistable element. By using the "C" input and the "S" input terminals any desired binary number may be preset or removed from the first and second registers, by external means (not shown). In addition, flip-flops 21–25 have a "T" input terminal, which represents a toggle input terminal. The appearance of an input at the toggle input terminal will cause the flip-flop to change from one stable state to another.

Also shown in the single figure of the drawing are a plurality of negative AND gates 31, 33, 35, 37 and 39. Each of these AND gates has a pair of input terminals and an output terminal. A first input terminal of AND gate 31 is connected to the "0" output of bistable element 11. A first input terminal of AND gate 33 is connected to the "0" output terminal of bistable element 12. A first input terminal of AND gate 35 is connected to the "0" output terminal of bistable element 13. A first input terminal of AND gate 37 is connected to the "0" output terminal of bistable element 14. A first input terminal of AND gate 39 is connected to the "0" output terminal of bistable element 15. These AND gates, 31, 33, 35, 37 and 39, are used to transfer the binary number stored in the first register to the second register.

There is also shown a plurality of OR gates 61, 62, 63, 64 and 65. Each of OR gates 61–65 has a plurality of input terminals and an output terminal. The output terminal of OR gate 61 is connected to the toggle input terminal of bistable element 21. The output terminal of OR gate 62 is connected to the toggle input terminal of bistable element 22. The output terminal of OR gate 63 is connected to the toggle input terminal of bistable element 23. The output terminal of OR gate 64 is connected to the toggle input terminal of bistable element 24. The output terminal of OR gate 65 is connected to the toggle input terminal of bistable element 25.

The output terminal of AND gate 31 is connected through an inverter 41 to a first input terminal on OR gate 61. The output terminal of AND gate 33 is connected through an inverter 43 to a first input terminal on OR gate 62. The output terminal of AND gate 35 is connected through an inverter 45 to a first input terminal on OR gate 63. The output terminal of AND gate 37 is connected through an inverter 47 to a first input terminal on OR gate 64. The output terminal of AND gate 39 is connected through an inverter 49 to a first input terminal on OR gate 65. Thus means are provided for transferring information from a bistable element in the first register to a corresponding bistable element representing the same bit significance in the second register.

There are also provided a plurality of negative AND inverter gates 51, 52, 53, 54, 55, 56, 57, 58, 59 and 60. AND inverter gates 51–60 each have a pair of input terminals and an output terminal. The output terminal of AND inverter gate 51 is connected to a second input terminal on OR gate 61. The output terminal of AND inverter gate 52 is connected to a second input terminal on OR gate 62. The output terminal of AND inverter gate 53 is connected to a second input terminal on OR gate 63. The output terminal of AND inverter gate 54 is connected to a second input terminal on OR gate 64. The output terminal of AND inverter gate 55 is connected to a second input terminal on OR gate 65. The "0" output terminal of bistable element 21 is connected to a first input terminal of AND inverter gate 52. The "0" output terminal of bistable element 22 is connected to a first input terminal on AND inverter gate 53. The "0" output terminal of bistable element 23 is connected to a first input terminal on AND inverter gate 54. The "0" output terminal of bistable element 24 is connected to a first input terminal on AND gate 55. The "0" output terminal of bistable element 25 is serially connected by a line 87, a delay element 88, and a line 89 to a first input terminal on AND inverter gate 51. Lines 87 and 89 are here shown as dotted for representing the fact that this connection provides an end-around borrow and is used only when 1's-complement arithmetic is used. Thus the bistable elements 21–25 of the second binary storage register are connected through the various logic gates, including gates 51–55, to form a counter. The counter will be actuated only when the state of a bistable element 21–25 changes from a "0" to a "1." When this occurs, a count will ripple through from the bistable element which changes state to the bistable element 25 which represents the most significant bit of the binary number. This will occur only when AND inverter gates 51–55 are enabled.

The output terminal of AND inverter gate 56 is connected to a third input terminal on OR gate 61. The output terminal of AND inverter gate 57 is connected to a third input terminal on OR gate 62. The output terminal of AND inverter gate 58 is connected to a third input terminal on OR gate 63. The output terminal of AND inverter gate 59 is connected to a third input terminal on OR gate 64. The output terminal of AND inverter gate 60 is connected to a third input terminal on OR gate 65. The "1" output terminal of bistable element 21 is connected to a first input terminal on AND inverter gate 57. The "1" output terminal of bistable element 22 is connected to a first input terminal on AND inverter gate 58.

The "1" output terminal of bistable element 23 is connected to a first input terminal on AND inverter gate 59. The "1" output terminal of bistable element 24 is connected to a first input terminal on AND inverter gate 60. The "1" output terminal of bistable element 25 is serially connected by a line 91, a delay element 92, and a line 93 to a first input terminal on AND inverter gate 56. Lines 91 and 93 are here shown as dotted for representing the fact that this connection provides an end-around carry and is used only when 1's-complement arithmetic is used. Thus again the bistable elements 21–25 of the second binary storage register are connected through the various logic gates, including this time gates 56–60, to form a counter. The counter will be actuated only when the state of a bitsable element 21–25 changes from a "1" to a "0." When this occurs, a count will ripple through from the bistable element which changes state to the bistable element 25 which represents the most significant bit of the binary number. This will occur only when AND inverter gates 56–60 are enabled.

There is also shown a block 81 representing control apparatus which is capable of providing control signals. Control apparatus 81 can provide an initiate add control signal on a line 76, or it can provide an initiate subtract control signal on line 75. Lines 75 and 76 are each connected to a separate input terminal on a NOR gate 82. Line 75 is also connected to a "C" or "clear" input terminal on a flip-flop 83. Line 76 is also connected to an "S" or "set" input terminal on flip-flop 83. A "0" output terminal on flip-flop 83 is connected by a line 84 to a second input terminal on each of AND inverter gates 56, 57, 58, 59 and 60. A "1" output terminal on flip-flop 83 is connected by line 86 to a second input terminal on each of AND inverter gates 51, 52, 53, 54 and 55. Thus the presence of a control signal on line 75 will clear flip-flop 83 to present a subtract signal on line 86 to enable gates 51–55, while the presence of a control signal on line 76 will set flip-flop 83 to provide an add signal on line 84 to enable gates 56–60.

The output or OR gate 82 is connected by a line 85 to a second input terminal of gate 31. The second input terminal on gate 31 is connected through a delay device 71 to a second input terminal on AND gate 33. The second input terminal on AND gate 33 is connected through a delay device 72 to a second input terminal on AND gate 35. The second input terminal on AND gate 35 is connected through a delay device 73 to a second input terminal on AND gate 37. The second input terminal on AND gate 37 is connected through a delay device 74 to a second input terminal on AND gate 39. Thus the presence of a control signal on either of lines 75 or 76 will be felt on line 85 to sequentially enable AND gates 31, 33, 35, 37 and 39 to sequentially transfer information from the respective of bistable elements 11–15 to the corresponding respective bistable element 21–25, to perform addition or subtraction of the numbers stored in the first and second binary storage registers.

To best explain the operation of the apparatus of this invention specific examples of subtraction and addition of binary numbers stored in the first and second registers will be given. First, assume that it is desired to subtract a −6 stored in the first register (that is, bistable elements 11–15), from a +9 stored in the second register (that is, bistable elements 21–25). It is obvious that the desired answer is +15.

The −6 is represented in binary form by 11001. The most significant bit representing the sign of the number, where a "0" is a +, and a "1" is a −. Thus in the first storage register, bistable element 11 will contain a 1, element 12 will contain a 0, element 13 will contain a 0, element 14 will contain a 1, and element 15 will contain a 1.

The binary representation of +9 in the second register is 01001. Therefore, bistable element 21 will contain a 1, element 22 will contain a 0, element 23 will contain a 0, element 24 will contain a 1, and element 25 will contain a 0.

Assume now that control apparatus 81 is actuated such that an initiate subtract control signal appears on line 75. This control signal will set flip-flop 83 to enable the second input terminals of AND inverter gates 51–55. The control signal on line 75 will simultaneously pass through OR gate 82 to be felt on line 85 and enable the second input terminal of AND gate 31. As AND gate 31 is a negative AND gate, the signal on line 85 will be a negative signal. The first input terminal of gate 31 is connected to the "0" output terminal of bistable element 11, which is presently storing a 1. Therefore, gate 31 will be enabled to pass the control signal, which will then pass through inverter 41 and OR gate 61 to toggle bistable element 21. Bistable element 21 was storing a 1 and will toggle to a 0 state. This change of state of bistable element 21 will not enable negative AND inverter gate 52, as the change of state was of the opposite plurality to enable gate 52, and therefore no count-down will be felt through bistable elements 22–25. At this stage of the subtract sequence the binary number in the second register will read 01000.

Delay device 71 prevents the control signal on line 85 from reaching gate 33, until the above described transfer of information from bistable element 11 to bistable element 21 is completed. Following completion of the above-described transfer of information, the delayed control signal on line 85 will reach the second input terminal of AND gate 33. Bistable element 12 is storing a 0 which makes the first input terminal of negative AND gate 33 positive, to prevent the passing of the control signal, and therefore no information is fed into bistable element 22. The binary number in the second register at this stage of the subtract sequence will therefore again read 01000.

The control signal from line 85 will eventually pass through delay device 72 to reach the second input terminal of AND gate 35. Inasmuch as bistable element 13 is also storing a 0, AND gate 35 will also prevent passage of the control signal, and no change of state will take place in bistable element 23. Therefore, following this portion of the subtract sequence, the binary number in the second register will still read 01000.

After a predetermined period of time the control signal from line 85 will pass through delay device 73 to reach the second input terminal of AND gate 37. Bistable element 14 is storing a 1, therefore negative AND gate 37 will be enabled to pass the control signal through inverter 47 and OR gate 64 to toggle bistable element 24. Bistable element 24 which was storing a 1 will switch to store a 0. Inasmuch as the change of state was from a 1 to a 0, the proper polarity will not appear at AND inverter gate 55 to pass through for a count-down of bistable element 25, and therefore bistable element 25 will not change its state. Following this portion of the subtract sequence the binary number stored in the second register will be 00000.

After sufficient time for the transfer of information from bistable element 14 to bistable element 24, the control signal from line 85 will eventually pass through delay device 74 to reach the second input terminal of AND gate 39. Bistable element 15 is storing a 1 and therefore the first input terminal of AND gate 39 is enabled to allow the passage of the control signal. The control signal will pass through inverter 49 and OR gate 65 to toggle bistable element 25. Bistable element 25 will therefore change from storing a 0 to storing a 1. At this stage of the subtract sequence the binary number stored in the second register will be 10000.

Inasmuch as this arithmetic operation is being performed in 1's-complement arithmetic, the end-around borrow apparatus 87, 88 and 89 will be connected in the circuit. Therefore, when bistable element 25 changes from a 0 to a 1, as described in the preceding paragraph, a proper enabling pulse will be felt on the second input terminal of AND inverter gate 51. The first input terminal of AND inverter gate 51 will still be enabled from the "1" output of flip-flop 83, and therefore the change of state of bistable element 25 will be felt through gate 51 and OR gate 61 to toggle bistable element 21. Bistable element 21 will change from a 0 to a 1. This in turn will be felt at the second input terminal of gate 52, and pass through gate 52 and OR gate 62 to toggle bistable element 22 from a 0 to a 1. This in turn will be felt on the second input terminal of gate 53, to pass through gate 53 and OR gate 63 to toggle bistable element 23 from a 0 to a 1. The toggling of bistable element 23 will also be felt on the second input terminal of gate 54 and will pass through gate 54 and OR gate 64 to toggle bistable element 24 from a 0 to a 1. This toggling of bistable element 24 will also be felt on the second input terminal of gate 55, and will pass through gate 55 and OR gate 65 to toggle bistable element 25 from a 1 to a 0. This toggling of bistable element 25 is of the wrong polarity to pass through gate 51, and the subtract sequence will therefore be completed. At this stage the binary number stored in the second register will be 01111, which will be recognized as the decimal number +15, the desired answer.

For an example of addition of the two binary numbers stored in the first and second registers, assume again that the first register contains a −6 and the second register contains a +9. Addition of these two numbers will obviously yield a +3. Once again, 11001 will be stored in the first register comprising bistable elements 11–15 with bistable element 11 being the least significant bit and bistable element 15 the most significant bit. Also, a 01001 will be stored in the second register comprising bistable elements 21–25, with bistable element 21 the least significant bit and bistable element 25 the most significant bit. Again, 1's complement arithmetic will be used, and therefore end-around carry apparatus 91, 92 and 93 will be connected in the circuit.

Control apparatus 81 will be operated so as to provide an initiate add control signal on line 76. This control signal will set flip-flop 83 to provide a signal on line 84 which will enable the first input terminals on negative AND inverter gates 56–60. This again will enable the counter comprising bistable elements 21–25. The control signal on line 76 will also be felt through OR gate 82 on line 85, to enable AND gate 31 as described in the subtract sequence above.

As described above, because bistable element 11 is storing a 1, the control signal will pass through gate 31, inverter 41, and gate 61 to toggle bistable element 21. Bistable element 21 was storing a 1 and will toggle to the 0 state. This change of state is of the proper polarity to pass through AND inverter gate 57 and OR gate 62 to toggle bistable element 22. Bistable element 22 will change from a 0 to a 1, which change is of the wrong polarity to pass through AND inverter gate 58. Therefore, at this stage of the add sequence the binary number stored in the second register will be 01010.

After a predetermined period of time the control signal on line 85 will pass through delay device 71 to enable gate 33. As bistable element 12 is storing a 0, there will be no transfer of information to bistable element 22, and at this stage of the add sequence the member in the second register will still be 01010.

After the control signal has passed through delay device 72 gate 35 will be enabled. However, bistable element 13 is storing a 0 and no information will be transferred to bistable element 23, therefore the binary number in the second register following this stage of the add sequence will still be 01010.

When the control signal from line 85 has had sufficient time to pass through delay device 73, gate 37 will be enabled. As bistable element 14 is storing a 1, the control signal will pass through gate 37, inverter 47 and gate 64 to toggle bistable element 24. Bistable element 24 will toggle from a 1 to a 0. This is a change of the proper polarity to allow a signal to pass through AND inverter gate 60 and OR gate 65 to toggle bistable element 25 from a 0 to a 1. This latter toggle is of the improper polarity to advance the count, and therefore at this stage of the add sequence the binary number stored in the second register will be 10010.

After a substantial period of time to allow the toggling of the preceding paragraph, the control signal from line 85 will pass through delay device 74 to enable gate 39. As bistable element 15 is storing a 1, the control signal will pass through gate 39, inverter 49 and gate 65 to toggle bistable element 25. Bistable element 25 will therefore change from a 1 to a 0. At this stage of the add sequence the binary number stored in the second register will be 00010.

As this is a 1's-complement arithmetic addition, end-around carry apparatus 91, 92 and 93 will be connected in the circuit. Therefore the last toggling of bistable element 25 from a 1 to a 0 will be felt through line 91, delay device 92, and line 93 on the input of gate 56. As flip-flop 83 is still set, gate 56 will still be enabled to pass the toggle signal from bistable element 25 through gate 56 and gate 61 to toggle bistable element 21. Bistable element 21 will therefore change from a 0 to a 1. This is a change of the wrong polarity to pass through gate 57 and therefore the add sequence will end, with the number stored in the second register being a 00011. This number is easily recognized as a +3, the desired answer.

From the foregoing description it will be apparent that the apparatus and method of this invention provide a novel way of adding and substracting binary numbers. It should be noted that the use of this invention provides a way of performing parallel addition and subtraction which decreases the amount of hardware needed over many of the prior known methods. It should also be noted that though the single figure of the drawings shows a preferred embodiment of this invention, there are other embodiments which could be used to perform the same results without departing from the spirit of the invention. The particular logic disclosed could have variations, such as changing the negative AND gates to positive AND gates and following through with this change in the remaining logic. However, such changes would not depart from the inventive scope of the described apparatus and method.

The embodiments of the invention in which an exclusive property or privilege is claimed are defined as follows:

1. Digital arithmetic apparatus comprising:
a first storage register including a first plurality of bistable storage elements;
a second storage register including a second plurality of bistable storage elements;
means for transferring information into said first and second storage registers;
means including first logic means interconnecting said second plurality of bistable elements to form an up-down counter;
means including second logic means connecting at least one output from each of said first plurality of bistable elements to an input of a corresponding one of said second plurality of bistable elements for transferring information from said first register to said second register;
control means for providing a control signal;
means connecting said control means to said first and second logic means for enabling said first and second logic means in the presence of the control signal; and
further means including delay means connected between said control means and said second logic means for selectively and sequentially enabling said first plurality of bistable elements in the presence of the control signal, said delay means providing a time period for partial summation between each transfer of information from each of said first plurality of bistable elements to the corresponding one of said second plurality of storage elements.

2. An adder-subtractor network comprising:
a first storage register adapted to receive and store a binary number ranging from a least significant bit to a most significant bit;
a second storage register adapted to receive and store a binary number ranging from a least significant bit to a most significant bit;
means interconnecting said second register to form a counter;
means for sequentially transferring the bits of the binary number in said first register to the position of the bit of equal significance in the second register for arithmetically combinging the binary numbers in said first and second registers;
control means for providing a control pulse; and
means connecting said control means to said first and second registers for selective transfer of bits from said first to said second register and including delay means connected between said control means and said means for sequentially transferring the bits of the binary number in said first register for providing a time period for partial summations between the sequential bit transfers.

3. The apparatus of claim 2 including means providing an end-around carry or borrow in said counter of said second register for performing 1's-complement arithmetic operations.

4. In a binary arithmetic unit, including first and second storage registers having equal amounts of bistable elements for storing binary numbers, the improvement for adding and subtracting binary numbers stored in the first and second registers comprising:
first logic means connected between the least significant bit bistable element of the first register and the least significant bit bistable element of the second register for transferring information from the first to the second register;
further logic means similar to said first logic means connecting each bistable element of the first register to the bistable element of the corresponding bit significance in the second register;
second logic means interconnecting the bistable elements of the second register to form an up-down counter, said counter being operative when said second logic means is enabled to count to the bistable state of the most significant bit from any bistable element which changes from a predetermined one stable state to another stable state upon transfer of information from the first register;
control means connected to said first, further and second logic means for enabling said first and second logic means; and
delay means connected between said control means and said further logic means for sequentially enabling said further logic means to allow a time period for partial summation between each transfer of information from the first register to the second register.

5. The improved binary arithmetic unit of claim 4 in which said second logic means includes means for providing an end-around carry or borrow in said count-down counter for performing 1's-complement arithmetic.

6. Digital subtraction apparatus comprising:
first and second binary information storage registers including, respectively, first and second pluralities of bistable elements having input terminals and a true and a false output terminal;
means connected to the input terminals of the bistable elements for transferring information into said first and second registers;
a first plurality of AND gates each having first and second input terminals and an output terminal;
means connecting the false output terminal on each of the first plurality of bistable elements to the first input terminal on a corresponding one of said first plurality of AND gates;

control means for providing a control signal;

means connecting said control means to the second input terminal on a first one of said first plurality of AND gates;

delay means serially connected between the second input terminals of said first plurality of AND gates;

a plurality of OR gates each having first and second input terminals and an output terminal;

means connecting each output terminal of said plurality of OR gates to a corresponding one of the input terminals on said second plurality of bistable elements;

means connecting the output terminal on each of said first plurality of AND gates to the first input terminal on a corresponding one of said plurality of OR gates;

a second plurality of AND gates each having first and second input terminals and an output terminal;

means connecting each of the output terminals of said second plurality of AND gates to the second input terminal on a corresponding one of said plurality of OR gates;

means connecting the false output terminal on each of said second plurality of bistable elements to one of the first input terminals on one of the second plurality of AND gates; and means connecting said control means to each of the second input terminals on said second plurality of AND gates so that in the presence of the control signal said first plurality of AND gates are sequentially enabled to transfer information from a selected one of said first plurality of bistable elements to a corresponding one of said second plurality of bistable elements, and said second plurality of AND gates is enabled to interconnect said second plurality of bistable elements into a count-down counter, for subtracting the information stored in said first register from the information stored in said second register.

7. Digital adder apparatus comprising:

first and second binary information storage registers including, respectively, first and second pluralities of bistable elements having input terminals and a true and a false output terminal;

means connected to the input terminals of the bistable elements for transferring information into said first and second registers;

a first plurality of AND gates each having first and second input terminals and an output terminal;

means connecting the false output terminal on each of the first plurality of bistable elements to the first input terminal on a corresponding one of said first plurality of AND gates;

control means for providing a control signal;

means connecting said control means to the second input terminal on a first one of said first plurality of AND gates;

delay means serially connected between the second input terminals of said first plurality of AND gates;

a plurality of OR gates each having first and second input terminals and an output terminal;

means connecting each output terminal of said plurality of OR gates to a corresponding one of the input terminals on said second plurality of bistable elements;

means connecting the output terminal on each of said first plurality of AND gates to the first input terminal on a corresponding one of said plurality of OR gates;

a second plurality of AND gates each having first and second input terminals and an output terminal;

means connecting each of the output terminals of said second plurality of AND gates to the second input terminal on a corresponding one of said plurality of OR gates;

means connecting the true output terminal on each of second plurality of bistable elements to one of the first input terminals on one of the second plurality of AND gates; and means connecting said control means to each of the second input terminals on said second plurality of AND gates so that in the presence of the control signal said first plurality of AND gates are sequentially enabled to transfer information from a selected one of said first plurality of bistable elements to a corresponding one of said second plurality of bistable elements, and said second plurality of AND gates is enabled to interconnect said second plurality of bistable elements into a a count-up counter, for adding the information stored in said first register to the information stored in said second register.

References Cited

UNITED STATES PATENTS

| | | | |
|---|---|---|---|
| 2,926,851 | 3/1960 | Weir et al. | 235—176 |
| 3,249,746 | 5/1966 | Helbig et al. | 235—176 |
| 3,257,551 | 6/1966 | Gotz et al. | 235—176 |

OTHER REFERENCES

Richards, R. V. Arithmetic Operations in Digital Computors, pp. 108, 109, 124; February 1955.

MALCOLM A. MORRISON, *Primary Examiner.*

V. SIBER, *Assistant Examiner.*